United States Patent Office 3,088,934
Patented May 7, 1963

3,088,934
METHOD OF PREPARING A DIISOCYANATE-BASED LAMINATING RESIN
Angelo P. Bonanni, 138A Haddon Hills Apts., Haddonfield, N.J.
No Drawing. Filed Mar. 24, 1960, Ser. No. 17,440
1 Claim. (Cl. 260—77.5)
(Granted under Title 35, U.S. Code (1952), sec. 266)

The invention described herein may be manufactured and used by or for the Government of the United States of America for governmental purposes without the payment of any royalties therein or therefor.

This invention relates to the making of a new chemical type of laminating resin and more particularly relates to a process for reacting a polyisocyanate directly with a glycol to form a new type of artificial resin.

Resins known under the prior art have use in a wide variety of applications; however, they have all had one or more serious deficiencies for practical use, such as brittleness, lack of abrasion resistance, lack of solvent resistance and a very short stability.

In one particular case, the preparation of a new type of resin was attempted by reacting an unsaturated diol directly with a polyisocyanate in the presence of styrene or some other unsaturated monomer. The purpose of the styrene was to limit the degree of polymerization.

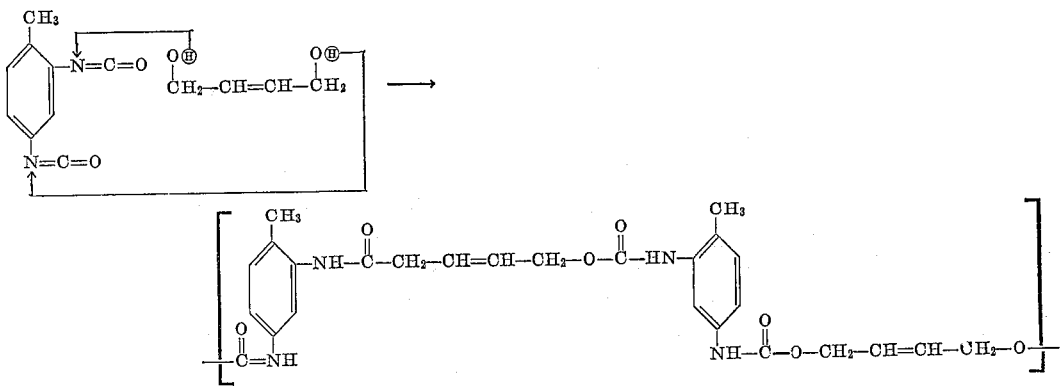

This method, although producing a polyurethane resin which exhibited stable chemical and physical properties suitable for the preparation of a glass cloth laminate, was difficult to control because of the reaction exotherm. Hence, it was difficult to predict and duplicate polyurethane laminating resins having stable chemical and physical properties.

Heretofore, in order to avoid such a large heat of reaction, it was the practice to first synthesize the ester from a suitable dicarboxylic acid and unsaturated diol and then react this ester from a suitable dicarboxylic acid and unsaturated diol and then react this ester with the diisocyanates to make the polyurethane resins. This reaction between the ester and the diisocyanate, although easier to control, proved to be unsatisfactory for the preparation of laminates since the polyurethane resins were soft and rubbery resembling unvulcanized natural rubber in appearance and consistency.

The process of manufacturing glass laminated forms for aeronautical use requires that the laminate be preheated at an elevated temperature before molding into the complex forms required for such use. Thus, a laminate interlayer for this application must remain sufficiently pliable and soft during the forming operation in order to permit forming of the laminate.

It is an object of this invention to prepare a laminating resin for use in combination with glass reinforcements to produce structural laminates for such things as radomes, rudder and fin tips, fuel cell backing boards and various missile components.

It is therefore another object of this invention to provide a method for making a resin that is hard and yet is able to withstand abrasion.

Another object is to provide a resin for use as an interlayer material in laminates whereby a substantial flexural strength is imparted to the laminate.

Yet another object is to provide a method for the preparation of a polyurethane laminating resin having stable chemical and physical properties that are easily duplicated.

Other objects and many of the attendant advantages of this invention will be readily appreciated as the same becomes better understood by reference to the following detailed description.

The formulation of a polyurethane resin, which possessed stable chemical and physical properties suitable for the preparation of a glass cloth laminate, was established through the fine control of the reaction exotherm caused by the cleavage of the double bond between the nitrogen and carbon atoms of the diisocyanate radical. This cleavage is triggered by the migration of the proton from the hydroxyl radical of the glycol. This is illustrated by the following reaction of 2,4-meta toluene diisocyanate with 2-butene-1,4 diol.

Since this reaction is exothermic in nature, the reaction is carried out inside of an ice bath. In this way, it is possible to retard the reaction rate of the diisocyanate. In order to prevent freezing of the diisocyanate, the solution is constantly stirred with a mechanical stirrer or the like. The glycol is added dropwise to retard the reaction rate between the diisocyanate and itself wherein the operator is able to control the degree of polymerization. Once the reaction is initiated, an aromatic solvent is added to also aid in retarding the polymerization of the resin. This reaction is allowed to continue until there is a significant drop in temperature which signifies the end of polymerization. The reaction exotherm produced depends upon the type of glycol used in the reaction with the diisocyanate. By employing glycols containing four carbon atoms, resins were formulated which, when used in the formation of glass laminates, imparted a flexural strength of over 90,000 p.s.i. to the laminates. The invention is further illustrated by the following specific examples.

Example 1

191.6 grams of 2,4 tolylene diisocyanate is added to a reaction flask. The flask is then packed in ice in order to lower the temperature of the diisocyanate to its freezing point. 88 grams of 2-butene-1,4-diol was slowly added with stirring. To retard polymerization of the resin, once the reaction is initiated, 139.8 grams of benzene is added at intervals of five minutes in 5 to 10 cc. portions. The solution is stirred throughout the time of reaction and the stirring continued for 30 additional minutes after a drop in temperature is noted which signifies a termination of reaction. The reaction exotherm produces a maximum temperature of approximately 40° C. lasting for approximately ten minutes. At this point, the solution takes on a hazy yellow appearance which instantly turns to crystal clear amber. The resin thus formulated had a consistency similar to honey and a pot life of approximately 4 to 5 hours.

The glass laminates were fashioned from this resin by immersing, singularly, twelve pieces of glass fabric in the resin and then laying them up 90° to one another. This lay-up was wrapped in a sheet of cellophane. The entire assembly was then placed between two highly polished steel platens, which had been heated to 300° F., and subjected to a load of approximately 1100 lbs. under a 50 ton capacity standard molding press. After twenty-five minutes, the load was reduced to the extent that the laminating assembly remained in a fixed position under a very slight load. The laminate was allowed to cool to 100° F. under these conditions, and it was then removed from the press.

This laminate had a thickness of 0.092 inch, a flexural strength of 90,080 lbs. per square inch, and a modulus of elasticity of $4.35 \times 10^{+6}$.

After immersion in boiling water for two hours, this laminate possessed a flexural strength of 61,400 lbs. per square inch, and a modulus of elasticity of $4.64 \times 10^{+6}$.

*Example II*

287.1 grams of 2,4 tolylene diisocyanate and 135.2 grams of butane-1,4-diol were reacted in the presence of 211.2 grams of benzene as described in Example I.

The laminate formed from this resin had a thickness of 0.089 inch, a flexural strength of 92,800 lbs, per square inch, and a modulus of elasticity of $4.14 \times 10^{+6}$.

After immersion in boiling water for two hours, this laminate possessed a flexural strength of 53,400 lbs. per square inch, and had a modulus of $4.71 \times 10^{+6}$.

*Example III*

191.6 grams of 2,4-tolylene diisocyanate and 106.1 grams of diethylene glycol were reacted in the presence of 148.8 grams of benzene as described in Example I.

The laminate prepared from this resin had a thickness of 0.090 inch, a flexural strength of 83,000 lbs. per square inch, and a modulus of $4.52 \times 10^{+6}$.

After immersion in boiling water for two hours, this laminate possessed a flexural strength of 35,900 lbs. per square inch, and a modulus of $2.52 \times 10^{+6}$.

The resins, formulated with glycols having a four-carbon chain, produced laminated panels that were consistent in imparting substantial flexural strength to the laminates.

Obviously many modifications and variations of the present invention are possible in the light of the above teachings. It is therefore to be understood that within the scope of the appended claim the invention may be practiced otherwise than as specifically described herein.

I claim the following:

An improved process for the manufacture of a laminating resin suitable for use in making glass laminates, said method comprising the steps of:

(1) reacting at a temperature of 20° C. 1.1 to 1.6 moles of 2,4-meta toluene diisocyanate with 1 to 1.6 moles of a polyhydric alcohol selected from the group consisting of 2-butene-1,4-diol, butane-1,4 diol, diethylene glycol, and triethylene glycol wherein the said glycol is added at a rate of 1 cc./min.;

(2) mixing 1 to 3 moles of benzene therewith for retarding polymerization of the said resin by selectively dissolving the resin without dissolving either the diisocyanate or the glycol;

(3) maintaining the reaction below 42° C. thereby limiting the degree of polymerization of the resin.

References Cited in the file of this patent

UNITED STATES PATENTS

| | | |
|---|---|---|
| 2,511,544 | Rinke et al. | June 13, 1950 |
| 2,692,874 | Langerak | Oct. 26, 1954 |
| 2,855,421 | Bunge et al. | Oct. 8, 1958 |